Sept. 30, 1969    G. W. ELLENBURG    3,469,865
JOINT STRUCTURE FOR USE IN LARGE CASINGS OR THE LIKE
Filed Feb. 24, 1964    2 Sheets-Sheet 1
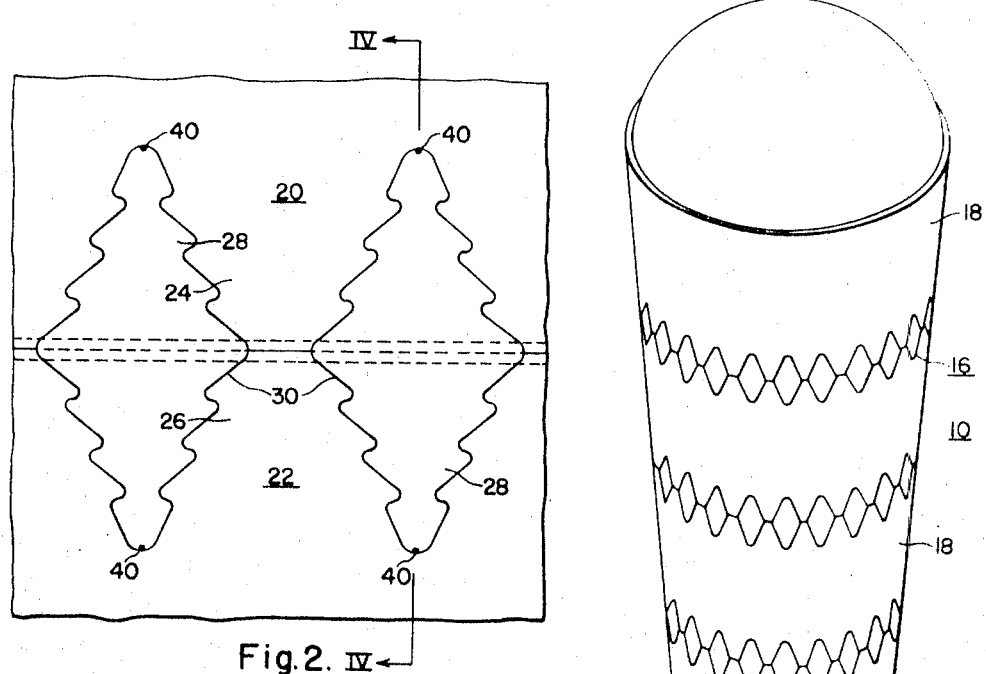
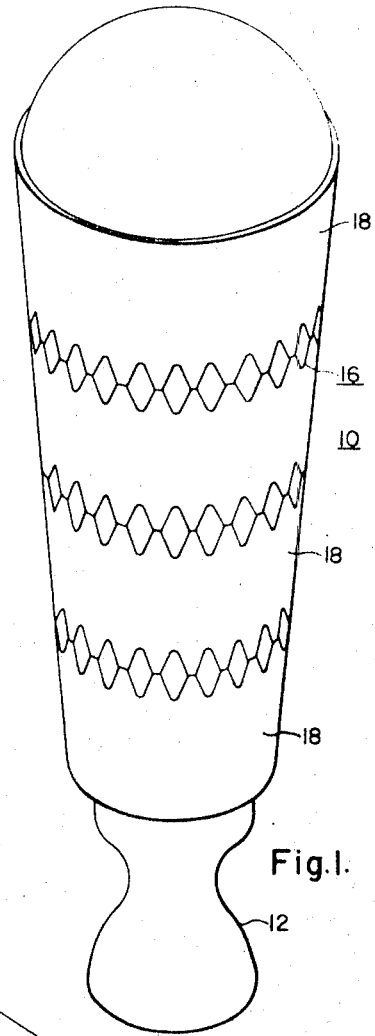
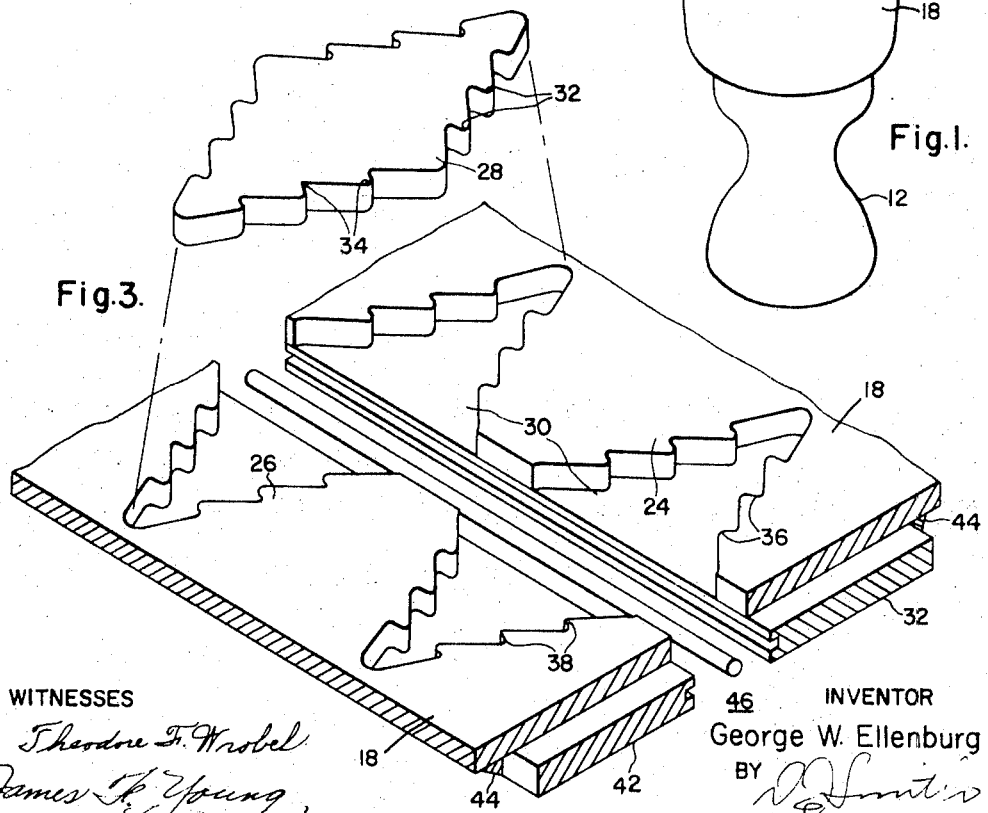
WITNESSES
Theodore F. Wrobel
James R. Young
INVENTOR
George W. Ellenburg
BY
ATTORNEY Sept. 30, 1969  G. W. ELLENBURG  3,469,865
JOINT STRUCTURE FOR USE IN LARGE CASINGS OR THE LIKE
Filed Feb. 24, 1964  2 Sheets-Sheet 2
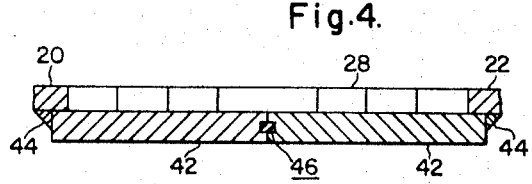
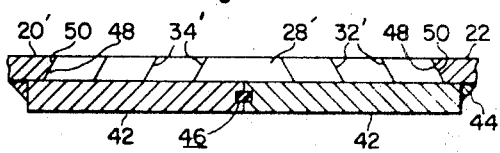
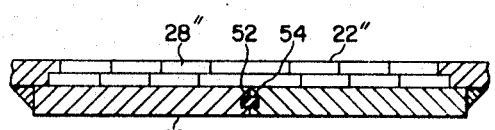
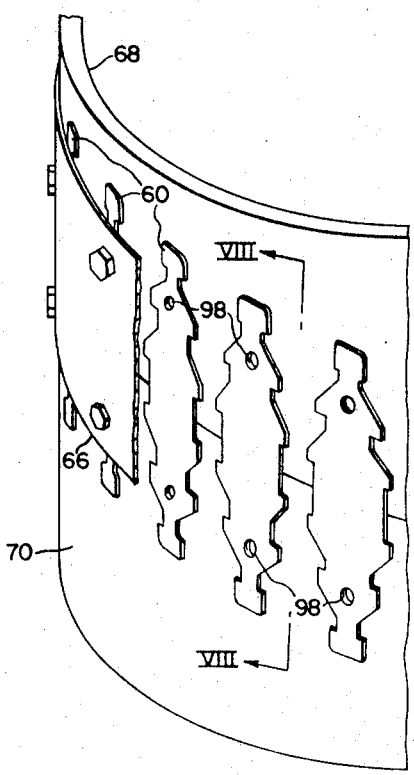
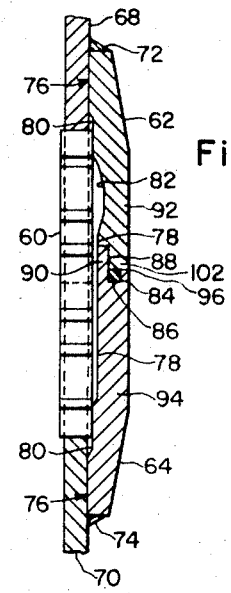
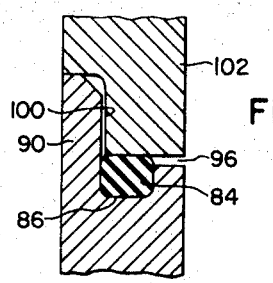

United States Patent Office 3,469,865
Patented Sept. 30, 1969

3,469,865
JOINT STRUCTURE FOR USE IN LARGE CASINGS OR THE LIKE
George W. Ellenburg, Ardmore, Pa., assignor to Westinghouse Electric Corporation, Pittsburgh, Pa., a corporation of Pennsylvania
Filed Feb. 24, 1964, Ser. No. 346,816
Int. Cl. F16b 3/00; F16l 13/02
U.S. Cl. 285—330                           9 Claims The present invention relates generally to joint structures and more particularly to joint structures which provide ready mechanical connection or severance between casing or vessel segments so as to form a unitary casing or vessel of a size which would ordinarily be difficult to transport as an integrated unit. More specifically, the joint structure is particularly adapted for use in rocket and the like vehicular devices, where the casing or vessel is subjected to severe operating pressures and temperatures and initial transportation thereof frequently is required to remote launching sites.

There are of course many other applications, for example in the case of nuclear reactor vessels and the like and other large reactor vessels, where it is desirable to produce the vessel in a plurality of parts or segments which can be readily transported to and assembled in the field, without the use of an extensive amount of pressure welding. In many applications, for example the aforementioned rocket casings, the casing or vessel serves primarily as the supporting enclosure or structure, having relatively thin walls, and it is desired to quickly and easily join the parts of the structure without unduly increasing the thickness of the walls.

As a specific example a pressure casing for a rocket vehicle is considered. With the continuing development of larger and larger sizes of chemical and other type rocket vehicles, it becomes desirable, and sometimes necessary because of ground transport limitations, or rocket design and propellant casting considerations, to provide the rocket casing in parts or segments of the large size casing or container, which is to be assembled in the field with a minimum of equipment and labor. Accordingly from a performance standpoint, the assembled casing and especially its mechanical joints between the parts or segments must be capable of reliably withstanding stresses incurred under conditions of launch and related operations. Normally, the casing contains a pressurized propellant, and it is then also necessary that the joint structures be positively and reliably sealed to prevent undesired leakage of the pressurized matter and of the exhaust gases occasioned by the progressive ignition of the propellant.

In developing an assembled rocket casing suitable for performance in the manner just described, it is preferable that the casing segments and joints therebetween not only be readily formable to provide the requisite containment strength but at the same time be constructed so as to be formable with a relatively small amount of waste material as compared with ordinary or heretofore known casing assemblage arrangements. Specifically, it is desirable to eliminate the need for the very expensive ring forgings or the like and the attendant costly machining operations in forming the joint structures so as to avoid the necessity of unduly thickening the structural material in the area of the joint, which leads to excessive joint induced casing deflection and distortion. Further, it is desirable to avoid the requirements of gross machining operations and/or of the extensive pressure welding pointed out above. Thus, a more economic and acceptable joint structure can be provided through the use of relatively thin rolled plate material, which incidentally need be machined to a relatively minimal extent, in a manner prescribed by the invention, and at the same time the disclosed joint structure so formed conforms to axial and pressure loading specifications normally obtainable only with the use of a forging ring joint.

In accordance with the broad principles of the present invention, a joint structure for a segmented, elongated casing subject to longitudinal or axial tensile loading and pressure-induced hoop loading comprises a plurality of juxtaposed casing segments, which are disposed axially along the length of the casing. Each pair of apposed edges of adjacent segments are respectively characterized with a doubly oscillatory or serrated outline, with the peaks of the individual serrations or projections of one edge being respectively in contact or in close juxtaposition with the individual serrations of the apposed edge. The juxtaposed casing segments can be respective rolled plate, wall portions of juxtaposed casing segments, and added joint strength against hoop forces caused by internal pressures can be provided by the securance of one or more band parts overlying the inner or outer surface area of the joint structure.

The aforementioned serrations or projections are maintained in peak-to-peak contact or juxtaposition and likewise the associated casing segments, by means of a keying arrangement which in turn is keyed or locked both to the serrations of one casing segment and to the serrations of an adjacent casing segment so as to prevent separation of the aforementioned serrations. In one arrangement of the invention the aforementioned serrations are again serrated, which cooperate with a complementary serration in the keying arrangement to effect locking of the keying arrangement to both series of apposed serrations.

It is contemplated that the serrated or doubly oscillatory joint arangement of the invention can be sealed by suitably welding the aforementioned band parts employed in certain applications to add joint strength to the structure. It is also contemplated by the invention that means be provided in association with the aforementioned joint structure and with the strengthening bands to maintain the keying arrangement in place.

In view of the foregoing it is an object of the invention to provide a novel and efficient joint structure for a segmented casing or container.

Another object of the invention is the provision of a joint structure of the character described wherein the thickness of the joint structure is not increased unduly with the result that induced casing deflection or distortion is minimized or eliminated altogether.

Another object of the invention is the provision of joint structure for a segmented casing wherein a relative minimum of waste material is incurred in the manufacture therein.

A still further object of the invention is to provide a joint structure of the character described which can be readily assembled in the field with a relative minimum of equipment and labor.

It is another object of the invention to provide a novel and efficient pressure casing or containment structure wherein separate segments thereof are secured together by joint structures of the character described.

An additional object of the invention is to provide a joint structure of the character described wherein the respective joint portions or projections of the juxtaposed casing or containment segments are apposed to each other along a doubly serrated or oscillatory region of joinder.

A more specific object of the invention is to provide a keying arrangement for maintaining the joint projections of the character described in contact or in close proximity to one another respectively.

Still another object of the invention is the provision of a joint structure of the character described wherein the respective joint portions can be of the same thickness as the walls of the associated casing segments.

A further object of the invention is to provide a joint structure of the character described wherein one or more band members extend along or overlie the region of joinder of the joint so as to provide strength against hoop forces induced in the casing or containment in the area of the joint. More specifically, it is an object of the invention to provide means associated with the aforementioned projections of the joint structure and cooperative with the band members for retaining the aforementioned keying arrangement in place.

Further objects of the invention are the provision of methods for producing, forming and securing the joint structures of the character described.

These and other objects, features and advantages of the invention will become more apparent upon consideration of the following detailed description together with the accompanying drawings, in which:

FIGURE 1 is a perspective view of a rocket vehicle having a segmented casing incorporating joint structures arranged in accordance with the principles of the invention;

FIG. 2 is an enlarged elevational view of a portion of one of the joint structures employed in the rocket casing of FIG. 1;

FIG. 3 is an exploded isometric view of the joint structure portion shown in FIG. 2;

FIG. 4 is an assembled cross sectional view of the joint structure taken generally along reference line IV—IV of FIG. 2, with parts being broken away to show the invention more clearly;

FIG. 5 is a cross sectional view of a modified form of the joint structure illustrated in FIG. 4 and showing additional joining means for the keying arrangement thereof;

FIG. 6 is a partial cross sectional view of still another form of the joint structure of the invention;

FIG. 7 is a partial isometric view, partially sectioned, of still another form of joint structure arranged in accord with the invention;

FIG. 8 is a partial, vertically sectioned view of the joint structure of FIG. 7, with parts being broken away, taken along reference line VIII—VIII thereof; and FIG. 9 is an enlarged partial cross-sectional view of the reinforcing rings of FIG. 8 in the region of their apposed edges.

Referring now to FIG. 1 of the drawings, there is shown an elongated rocket vehicle 10 having a propellant exhaust nozzle 12 which is attached to the lower or trailing end of the vehicle 10 and further having an elongated generally cylindrical segmented casing 14 constructed and formed in accordance with the principles of the invention. The casing material is preferably characterized with good structural strength, and an example of such material is tool steel.

Generally, a joint structure 16 is provided along each region of joinder between the juxtaposed casing segments 18 which in this case are cylindrical in form. Each joint structure 16 includes the associated pair of juxtaposed serrated or oscillatory edges 20 and 22 respectively of the adjacent casing segments 18. Each adjacent pair of casing segments 18 are radially and axially aligned so that their serrations or projections are engaged or juxtaposed in peak-to-peak relationship respectively. Thus, the adjacent edges of each pair of casing segments 18 are apposed along a doubly serrated or oscillatory line of joinder.

Desirably, however, relatively small clearances are left between the apposed peaks of each pair of projections 24, 26 so that axially directed compressive as well as axially directed tensile stresses will be imposed primarily upon the keying arrangement presently to be described rather than applying distortive compressive axial forces initially upon the aforementioned peaks.

One arrangement for securing each pair of casing segments 18 together with their projections 24 and 26 in a peak-to-peak relationship comprises a plurality of generally diamond-shaped keys 28, which are inserted into the complementarily shaped spaces 30 formed between adjacent pairs of projections 24 and 26. The keys 28 can be further characterized as having a double "fir tree" shape which is lent thereto by the use of additional serrations 32 and 34 formed at regular intervals in the lateral edges of each of the keys 28. It will be seen that the dwells of the serrations 32 are shaped to oppose those of the serrations 34 on each of the keys 28. Similarly disposed serrations 36 and 38 are formed on the adjacent edges of the casing segment projections 24 and 26 respectively.

With this arrangment the serrations 32 of each of the keys 28 cooperate with their respectively adjacent complementary serrations 36 of the casing segment projections 24 to secure the upper end of each key 28 thereto. Similarly, the serrations 34 of the lower portion of each key 28 cooperate with the complementarily disposed serrations 38 of the adjacent projections 26 of the lower casing segment, as viewed in FIG. 3 of the drawings. The opposing disposition of the cooperating serrations 32–36 at the upper edges of each key 28 relative to the cooperating serrations 34–38 at its lower edges prevents separation of each pair of casing segments 18, once the keys 28 are inserted generally into the plane of their adjacent projections 24 and 26. For relatively smaller vessels or containers or for relatively large keys 28 as the case may be, each key 28 can be formed with an arcuate configuration, if desired, to conform more closely to the curvature of the adjacent portions of the joint structure 16.

The keys 28, in the arrangement of the invention of FIGS. 2–4, are formed with normal or right-angular edges, relative to the surfaces of the keys 28, so that each key can be moved radially into its associated opening from either the outside or inside of the casing. During use of the casing, however, in rocketing and in other applications involving elevated pressures, the keys 28 can be primarily held in position against a backup ring arrangement overlying the joint structure 16 and presently to be described in detail, by the internal pressures generated or imposed within the casing or vessel. In non-rocket applications, spot welds 40 can be used to hold the keys 28 in place, or the individual keys 28 can be secured in the alternative arrangements presently to be described with reference to FIG. 5 or 6 of the drawings.

With the arrangement thus far described, the assembled casing is adequately able to withstand imposed axial compressive or tensile forces. For the purpose of countering hoop stresses induced by internal pressures and for the purpose of sealing the joint structure where required one or more backup bands 42 are employed. In the arrangement as shown in FIGS. 1 to 4 two such backup bands 42 are employed and are secured respectively to the associated casing segments 18. In the specific example of the rocket casing presented herein the bands 42 desirably are secured to the inner surfaces of the joint structure to permit ready insertion of the keys 28 into the rocket casing, as the latter is loaded with propellant. The rings 42 are indicated at 44 desirably are seam welded or brazed to the associated casing segments 18 respectively in order to lend a gas tight character to the joint structure. The rings 42 can also be sealed in place by a suitable plastic, as the seal is for gas tight, not strength purposes. In furtherance of this purpose, a groove and gasket arrangement denoted generally by the reference character 46 is provided in the juxtaposed edges of the backup rings 42.

It is contemplated, of course, that a single backup ring (not shown) equal in combined width to that of the backup rings 42 can be employed in their stead. Moreover, either the single backup ring or the double backup rings 42 can be applied to the outside of the vessel or casing where manufacturing conditions permit.

Referring now to FIG. 5 of the drawings, a modified arrangement for securing the keys 28 in place is illustrated. In the latter arrangement each of the keys 28' is provided with their edges beveled away from the backup rings 42, i.e. at an acute angle to the backup rings and to the adjacent surfaces of the respective keys 28' as denoted by the reference character 48. However, each of the keys 28' are still provided with the serrations 32' and 34' which are essentially similar to those described above in connection with FIGS. 2 to 4 of the drawings, save that their edges likewise are so beveled. The respective adjacent edges of the casing joint structure portions 20' and 22' together with their serrations 36 and 38 are beveled toward the backup rings 42, i.e. the bevel being at an obtuse angle to the backup rings and to the adjacent surfaces of the joint structure portions 20' and 22'. With this arrangement then with the keys 28' being first inserted from the lower portion of FIG. 5, the keys 28' are then entrapped between the backup rings 42 when applied and the complementarily beveled edges 50 of the joint structure portions 20' and 22'.

One advantage of a modification of FIG. 5 is that the tapered configuration of the keys 28' and the surrounding joint structure portions 20' and 22' permit the keys 28' to fit snugly against the inclined edges of the joint structure portions 20' and 22' so that a condition of zero back-lash in the assembled joint is attained. Moreover, it is possible to preload the joint if desired by making the keys 28' of slightly greater thickness than that of the surrounding portions 20' and 22' of the joint structure so that the keys 28' are seated forcefully in engagement against the inclined or beveled edges 50 of the joint structure portions 20' and 22' by the backup rings 42. Alternatively, suitable bosses (not shown) can be formed on either the inside surfaces of the backup rings 42 or the adjacent surfaces of the keys 28' to effect such forceful engagement. As an additional alternative, of course, the joint structure can be preloaded by making the openings defined by the projections 24 and 26 slightly smaller than the keys 28' such that the keys 28' when inserted therein do not initially seat flushly relative to the surrounding joint structure portions 20' and 22'.

The modification of FIG. 6 is arranged likewise to secure the keys 28'', which are provided with stepped edges 52, between complementarily stepped edges 54 of the casing joint structure portions, such as 22'', and the backup rings 42.

Another configuration of the joint structure of the invention is illustrated in FIGS. 7 and 8. The major components of the latter joint are the trapezoidal shaped keys 60, the reinforcing rings 62 and 64 to carry the hoop loads, and the retaining band 66 to hold the keys in place.

The reinforcing rings 62 and 64 are fastened respectively to the adjacent casing sections 68 and 70 by fillet welds 72 and 74. These welds are subjected to very small axial forces, and, therefore, can be made of a ductile weld material of low strength. The contour of the reinforcing rings is established such that contact is made with the casing sections only for a short distance from the weld, as denoted by reference characters 76. Relief portions 78 permit the keys 60 to extend inwardly beyond the thickness of the adjacent casing. The keys are prevented from extending too far inward by steps 80 on the reinforcing rings near the ends of the keys. The remaining inner surface of the reinforcing ring 62 is cut away at 82 for clearance purposes and to achieve the proper contour for deflections when the casing is pressurized, as noted anon. The keys 60 in this example are made thicker than the adjacent casing to permit them to be made flat and yet ensure full engagement of the cylindricity of the adjacent joint portions with the keys.

The joint is sealed by an O-ring 84 that is retained in a groove 86 provided therefor on the lower reinforcing ring 64, as viewed in FIGS. 7 and 8, to prevent accidental displacement of the O-ring from its slot during assembly operations. The confronting edges of the reinforcing rings 62 and 64 are offset to afford a lapped joint therebetween at 88 and the upper reinforcing ring 62 is purposely made with a thinner cross section than the lower ring 64 by virtue of the cutaway portion 82. This is done to ensure that the radial deflection of the upper ring 62 will tend to be larger, thereby ensuring continued engagement of the lapped joint 88 during pressurization of the casing and thus preventing extrusion of the O-ring 84 therebetween. In addition, the lip 90 on reinforcing ring 64 serves to maintain positive alignment of the reinforcing rings 62 and 64 in a radial direction and to establish the axial position of the case segments upon assembly. These are the only surfaces that require machining after assembly of the reinforcing rings to the cylindrical portion of the case. Moreover, by thus providing deflecting portions 92 and 94 in the reinforcing rings 62 and 64, outward radial movement thereof tends to decrease rather than increase the O-ring gap 96, as the apposed edges of the rings pivot outwardly about the longer end of the lower ring lip 90. In furtherance of this purpose a smaller vertical gap 100 is provided between the lip 90 and the upper ring lip 102, as better shown in FIG. 9. In addition, the deflection defining portions 92 and 94 prevent the application of substantial radial stresses to the keys 60.

The key design shown has three pairs of apposed teeth on each side. If axial joint strength higher than approximately 130% of the vessel is desired, this number can be increased. Tests have indicated that the stresses on the teeth at the strength levels normally employed in rocket cases are well within the material capabilities.

For basic assembly, it is anticipated that three keys without serrations on one end would be inserted in the lower casing segment, and that these would be used to align the segments for the insertion of the remaining keys, at which time the assembly keys would be removed. An alternative approach would be the utilization of a suitable male-female configuration not shown on the case portion of the joint at a similar number of places.

The retaining band 66 is held in place after being secured around the circumference of the casing by occasionally bolting it to drilled and tapped holes 98 provided in each key 60. The holes 98 are provided primarily for key removal, if such is required, after assembly, and therefore, the band 66 is not necessarily bolted to each key.

From the foregoing it will be apparent that novel and efficient forms of joint structures have been disclosed herein. Although the joint structures have been described primarily in connection with an assemblage of rocket casing segments, it will be obvious that many other applications exist for the disclosed joint structures. For example, such structures have application for use in relatively large pressure vessels and other containment structures and in large diameter conduits and the like.

Accordingly, numerous modifications of the invention will occur to those skilled in the art without departing from the spirit and scope of the invention. It is to be understood that certain features of the invention can be employed without a corresponding use of other features. Accordingly, the descriptive materials hereof are presented for purposes of illustrating the invention and are not to be taken as limitative thereof.

Accordingly what is claimed as new is:

1. An annular joint structure for an elongated segmented tubular casing, said joint structure comprising juxtaposed joint structure portions formed on the confronting edge portions of an adjacent pair of annular segments comprising said casing, said juxtaposed joint structure portions each including a pair of openings in said edge portions, said openings facing each other and being defined by a plurality of spaced projections, the projections in one joint portion being disposed in peak-to-peak relationship with the projections respectively of the other of said joint structure portions, a key member inserted into each of the openings defined by said projections, means for securing each of said key members to each of the adjacent projections to prevent separation of the projections of one joint structure portion from the projections of the other joint structure portion, and at least one backup ring overlying said joint structure portions and said key members.

2. An annular joint structure for an elongated segmented tubular casing, said joint structure comprising juxtaposed joint structure portions formed on the confronting edge portions of an adjacent pair of annular segments comprising said casing, said juxtaposed joint structure portions each including a pair of openings in said edge portions, said openings facing each other and being defined by a plurality of spaced projections, the projections in one joint portion being disposed in peak-to-peak relationship with the projections respectively of the other of said joint structure portions, a key member inserted into each of the openings defined by said projections, means for securing each of said key members to each of the adjacent projections to prevent separation of the projections of one joint structure portion from the projections of the other joint structure portion, at least one backup ring overlying said joint structure portions and said key members, and cooperating means formed on said projections and each of said key members having cooperating beveled edges for securing said key members radially against said backup ring.

3. A joint structure for an elongated segmented casing, said joint structure comprising juxtaposed joint structure portions formed on the confronting edge portions of an adjacent pair of segments comprising said casing, said juxtaposed joint structure portions each including a pair of openings in said edge portions, said openings facing each other and being defined by a plurality of spaced projections, the projections in one joint portion being disposed in peak-to-peak relationship with the projections respectively of the other of said joint structure portions, a key member inserted into each of the openings defined by said projections, means for securing each of said key members to each of the adjacent projections to prevent separation of the projections of one joint structure portion from the projections of the other joint structure portion, a least one backup ring overlying said joint structure portions and said key members, the edges of said projections being beveled toward said backup ring and the edges of each of said key members being complementarily beveled for engagement therewith so that said key members are retained between said beveled projection edges and said backup ring.

4. A joint structure for an elongated segmented casing, said joint structure comprising juxtaposed joint structure portions formed on the confronting edge portions of an adjacent pair of segments comprising said casing, said joint structure portions each including a pair of openings in said edge portions, said openings facing each other and being defined by a plurality of spaced projections, the projections in one joint portion being disposed in peak-to-peak relationship with the projections respectively of the other of said joint structure portions, a key member inserted into each of the openings defined by said projections, means for securing each of said key members to each of the adjacent projections to prevent separation of the projections of one joint structure portion from the projections of the other joint structure portion, at least one backup ring overlying said joint structure portions and said key members, the edges of said projections being beveled toward said backup ring and the edges of each of said key members being complementarily beveled for engagement therewith so that said key members are retained between said beveled projection edges and said backup ring, and the means associated with one of said backup ring and said key members for urging said key members forcefully against said beveled projection edges in order to preload said joint structure.

5. A joint structure for an elongated segmented casing, said joint structure comprising juxtaposed joint structure portions formed on the confronting edge portions of an adjacent pair of segments comprising said casing, said joint structure portions each including a pair of openings in said edge portions, said openings facing each other and being defined by a plurality of spaced projections, the projections in one joint portion being disposed in peak-to-peak relationship with the projections respectively of the other of said joint structure portions, a key member inserted into each of the openings defined by said projections, means for securing each of said key members to each of the adjacent projections to prevent separation of the projections of one joint structure portion from the projections of the other joint structure portion, and a backup ring structure overlying said joint structure portions and said key members, said backup ring structure having its adjacent surface stepped away from said keys near the ends thereof to determine the inserted position of said keys.

6. A joint structure for an elongated segmented casing, said joint structure comprising juxtaposed joint structure portions formed on the confronting edge portions of an adjacent pair of segments comprising said casing, said joint structure portions each including a pair of openings in said edge portions, said openings facing each other and being defined by a plurality of spaced projections, the projections in one joint portion being disposed in peak-to-peak relationship with the projections respectively of the other of said joint structure portions, a key member inserted into each of the openings defined by said projections, means for securing each of said key members to each of the adjacent projections to prevent separation of the projections of one joint structure portion from the projections of the other joint structure portion, and a backup ring structure on the inner surface of said casing and overlying said joint structure portions and said key members, said ring structure being sealed adjacent its lateral edges to said joint structure and being provided with a relief portion in its surface adjacent at least the major part of said joint structure so that upon pressurization of said casing radial deflection in said ring structure can occur without the imposition of substantial hoop stresses upon said joint structure.

7. A joint structure for an elongated segmented casing, said joint structure comprising juxtaposed joint structure portions formed on the confronting edge portions of an adjacent pair of segments comprising said casing, said joint structure portions each including a pair of openings in said edge portions, said openings facing each other and being defined by a plurality of spaced projections, the projections in one joint portion being disposed in peak-to-peak relationship with the projections respectively of the other of said joint structure portions, a key member inserted into each of the openings defined by said projections, means for securing each of said key members to each of the adjacent projections to prevent separation of the projections of one joint structure portion from the projections of the other joint structure portion, at least one backup ring overlying said joint structure portions and said key members, a retaining band overlying at least a portion of the obverse surface of said joint structure and said key members, relative to said ring, and fastening means for securing said retaining band to at least some of said key members.

8. A joint structure for an elongated segmented casing said joint structure comprising juxtaposed joint structure portions formed on the confronting edge portions of an adjacent pair of segments comprising said casing, said joint structure portions each including a pair of openings in said edge portions, said openings facing each other and being defined by a plurality of spaced projections, the projections in one joint portion being disposed in peak-to-peak relationship with the projections respectively of the other of said joint structure portions, a key member inserted into each of the openings defined by said projections, means for securing each of said key members to each of the adjacent projections to prevent separation of the projections of one joint structure portion from the projections of the other joint structure portion, and a backup ring structure on the inner surface of said casing and overlying said joint structure portions and said key members, said backup ring structure having its adjacent surface stepped away from said keys near the ends thereof to determine the inserted position of said keys, said ring structure in addition being sealed adjacent its lateral edges to said joint structure and being provided with a relief portion in its surface adjacent at least the major part of said joint structure so that upon pressurization of said casing radial deflection in said ring structure can occur without the imposition of substantial hoop stresses upon said joint structure.

9. A joint structure for an elongated segmented casing, said joint structure comprising juxtaposed joint structure portions formed on the confronting edge portions of an adjacent pair of segments comprising said casing, said joint structure portions each including a pair of openings in said edge portions, said openings facing each other and being defined by a plurality of spaced projections, the projections in one joint portion being disposed in peak-to-peak relationship with the projections respectively of the other of said joint structure portions, a key member inserted into each of the openings defined by said projections, means for securing each of said key members to each of the adjacent projections to prevent separation of the projections of one joint structure portion from the projections of the other joint structure portion, and a backup ring structure on the inner surface of said casing and overlying said joint structure portions and said key members, said ring structure being sealed adjacent its lateral edges to said joint structure and being provided with a relief portion in its surface adjacent at least the major part of said joint structure so that upon pressurization of said casing radial deflection in said ring structure can occur without the imposition of substantial hoop stresses upon said joint structure, said joint structure being formed from a pair of aligned and juxtaposed rings, a pair of cooperating lap portions respectively formed on the confronting lateral edges of said rings, and sealing means compressed between the inner one of said lap portions and the adjacent portion of the confronting lateral edge so that upon pressurization of said casing said sealing means is subjected to increased compression.

References Cited

UNITED STATES PATENTS

| 1,446,274 | 2/1923 | Roberts. |
| 1,687,343 | 10/1928 | Madden _____ 220—75 |
| 2,204,392 | 6/1940 | Arm. |

FOREIGN PATENTS 504,380  4/1939  Great Britain.

CARL W. TOMLIN, Primary Examiner

ANDREW V. KUNDRAT, Assistant Examiner

U.S. Cl. X.R.

287—103